(12) United States Patent
Kumar et al.

(10) Patent No.: US 7,771,880 B2
(45) Date of Patent: Aug. 10, 2010

(54) SOLID COMPOSITE ELECTROLYTE MEMBRANE AND METHOD OF MAKING

(75) Inventors: Binod Kumar, Dayton, OH (US); Joykumar Singh Thokchom, Dayton, OH (US)

(73) Assignee: University of Dayton, Dayton, OH (US)

( * ) Notice: Subject to any disclaimer, the term of this patent is extended or adjusted under 35 U.S.C. 154(b) by 933 days.

(21) Appl. No.: 11/601,965

(22) Filed: Nov. 20, 2006

(65) Prior Publication Data

US 2007/0117026 A1     May 24, 2007

Related U.S. Application Data

(60) Provisional application No. 60/738,512, filed on Nov. 21, 2005.

(51) Int. Cl.
*H01M 6/18* (2006.01)
*H01M 6/16* (2006.01)

(52) U.S. Cl. .................... 429/320; 429/322; 429/326

(58) Field of Classification Search .............. 429/304, 429/320, 322, 326
See application file for complete search history.

(56) References Cited

U.S. PATENT DOCUMENTS 5,702,995 A   12/1997   Fu
6,132,905 A   10/2000   Kumar et al.

OTHER PUBLICATIONS

Zang, Xiang-Wu, et al., "Characteristics of lithium-ion-conducting composite polymer-glass secondary cell electrolytes", Journal of Power Sources, 112(2002), 209-215.*

Thokchom, J.S., et al., "Ionically Conducting Composite Membranes from the $Li_2O-Al_2O_3-TiO_2-P_2O_5$ Glass-Ceramic", J. Am. Ceram. Soc. 90 [2] pp. 462-466, 2007.

Thokchom, J.S., et al., "Water Durable Lithium Ion Conducting Composite Membranes from the $Li_2O-Al_2O_3-TiO_2-P_2O_5$ Glass-Ceramic", Journal of the Electrochemical Society, 154 (4) I-XXXX (2007).

* cited by examiner

*Primary Examiner*—Patrick Ryan
*Assistant Examiner*—Thomas H. Parsons
(74) *Attorney, Agent, or Firm*—Dinsmore & Shohl LLP

(57) ABSTRACT

A solid composite electrolyte membrane for use in a lithium battery is provided which exhibits a conductivity ranging from about $10^{-4}$ S cm$^{-1}$ to about $10^{-3}$ S cm$^{-1}$ at ambient temperature. The membrane is formed by providing a glass or glass-ceramic powder formed from a mixture of lithium carbonate, alumina, titanium dioxide, and ammonium dihydrogen phosphate. The powder is mixed with a conditioning agent and at least one solvent, followed by the addition of a binder and one or more plasticizers. The resulting slurry is cast into a tape which is then subjected to a binder burn-off and sintering process to form the membrane. The resulting membrane may be a glass-ceramic composite having a porosity ranging from 0 to 50%, or the membrane may be further infiltrated with a polymer to form a water-impermeable polymeric-ceramic composite membrane.

16 Claims, 4 Drawing Sheets

SOLID COMPOSITE ELECTROLYTE MEMBRANE AND METHOD OF MAKING

CROSS REFERENCE TO RELATED APPLICATIONS

This application claims the benefit of U.S. Provisional Application No. 60/738,512 entitled POLYMER-CERAMIC COMPOSITE, WATER IMPERMEABLE LITHIUM ION CONDUCTING MEMBRANE AND METHOD OF MAKING filed on Nov. 21, 2005. The entire contents of said application are hereby incorporated by reference.

STATEMENT REGARDING FEDERALLY SPONSORED RESEARCH OR DEVELOPMENT

This invention was made with government support under Contract No. 2004*H691200*000 awarded by the Office of Advanced Technologies and Programs (OATP). The government has certain rights in the invention.

BACKGROUND OF THE INVENTION

The present invention relates to a solid composite electrolyte membrane comprising a glass-ceramic composite or a polymer-ceramic composite, and more particularly, to a solid composite electrolyte membrane and a method of making such a membrane for use in lithium ion batteries.

Rechargeable lithium ion batteries are widely used in the art, and generally comprise a lithium anode, a layered insertion cathode, and a membrane which separates the anode and cathode and which contains a lithium ion conducting electrolyte material. Lithium ion batteries currently in use typically employ porous polymeric membranes filled with liquid electrolytes. Liquid electrolytes are typically used because they possess high conductivity; however, the flammability and corrosiveness of such liquid electrolytes severely limit their performance. In addition, such liquid electrolytes often have a short life cycle due to the thermal instability of lithium salt.

While attempts have been made to use solid lithium ion conductors such as single crystals of $Li_3N$ and $LiI—Li_2S—B_2S_3$ glasses, the poor electrochemical stability of $Li_3N$ and poor chemical stability of $LiI—Li_2S—B_2S_3$ glasses have limited the use of these materials in lithium rechargeable batteries. In order to be useful, solid electrolyte membranes must exhibit high ambient temperature conductivity, a large cationic transport number, compatibility with potential electrodes, electrochemical stability, and must be easily processed into useful shapes.

In addition to lithium ion batteries, lithium-air and lithium-water batteries have also been developed. However, the use of these batteries has also been limited by the lack of a chemically stable electrolyte having high conductivity.

Accordingly, there is still a need for a lithium ion conducting electrolyte membrane for use in lithium ion batteries which is not subject to electrochemical instability and which exhibits high conductivity.

SUMMARY OF THE INVENTION

The present invention meets that need by providing a lithium ion conducting solid electrolyte membrane comprised of a glass-ceramic or polymer-ceramic composite. The membrane functions as both a separator and a lithium ion conductor, and may be formed so that it is either porous or fully dense and water impermeable, depending on the desired end use.

According to one aspect of the present invention, a method of forming a solid composite electrolyte membrane for use in a lithium battery is provided which includes providing a glass or glass-ceramic powder formed from a mixture of lithium carbonate, alumina, titanium dioxide, and ammonium dihydrogen phosphate.

The glass or glass-ceramic powder preferably comprises from about 2 to about 7 wt % lithium oxide ($Li_2O$), from about 7 to about 12 wt % alumina ($Al_2O_3$), from about 25 to about 45 wt % titanium dioxide ($TiO_2$), and from about 30 to about 70 wt % diphosphorous pentoxide ($P_2O_5$). The powder preferably has a particle size of from about 1 to about 75 µm, and more preferably, from about 1 to 45 µm.

The method further includes mixing the powder with a conditioning agent and at least one solvent to form a slurry, and adding a binder and at least one plasticizer to the slurry, where the binder and plasticizer contain organic components. The conditioning agent preferably comprises fish oil. Preferred solvents include xylene, alcohol, or combinations thereof. The binder preferably comprises poly(vinyl butyl). The plasticizer is preferably selected from butylbenzyl phthalate, poly(alkylene glycol), and combinations thereof.

The resulting slurry is then cast into a tape which is heated to burn off the organic components and sintered to form a membrane. The tape is preferably heated at a temperature from about 25 to 400° C. to burn off the organic components. The tape is preferably sintered at a temperature of from 400 to 1200° C. The resulting membrane is a solid glass-ceramic composite membrane. The membrane may have a porosity of from about 0% (fully dense membrane) to about 50%. The porosity may be varied as desired by varying the sintering temperature and time.

Where the glass-ceramic membrane is porous, the method may further include infiltrating the membrane with a polymer to form a polymer-ceramic composite membrane. The polymer is preferably selected from polyethylene and polytetrafluoroethylene. The resulting polymer-ceramic composite membrane is water impermeable.

The solid glass-ceramic or polymer-ceramic composite electrolyte membrane formed by the method of the present invention has a room temperature conductivity ranging from about $10^{-4}$ S cm$^{-1}$ to about $10^{-3}$ S cm$^{-1}$. The membrane preferably has a thickness of from about 50 to 350 µm.

Accordingly, it is a feature of the invention to provide a solid composite electrolyte membrane for use in lithium batteries which exhibits high conductivity, and which can be produced in either porous or dense and water impermeable forms. Other features and advantages will be apparent from the following description and the accompanying drawings.

DETAILED DESCRIPTION OF THE PREFERRED EMBODIMENT

Figure 1:
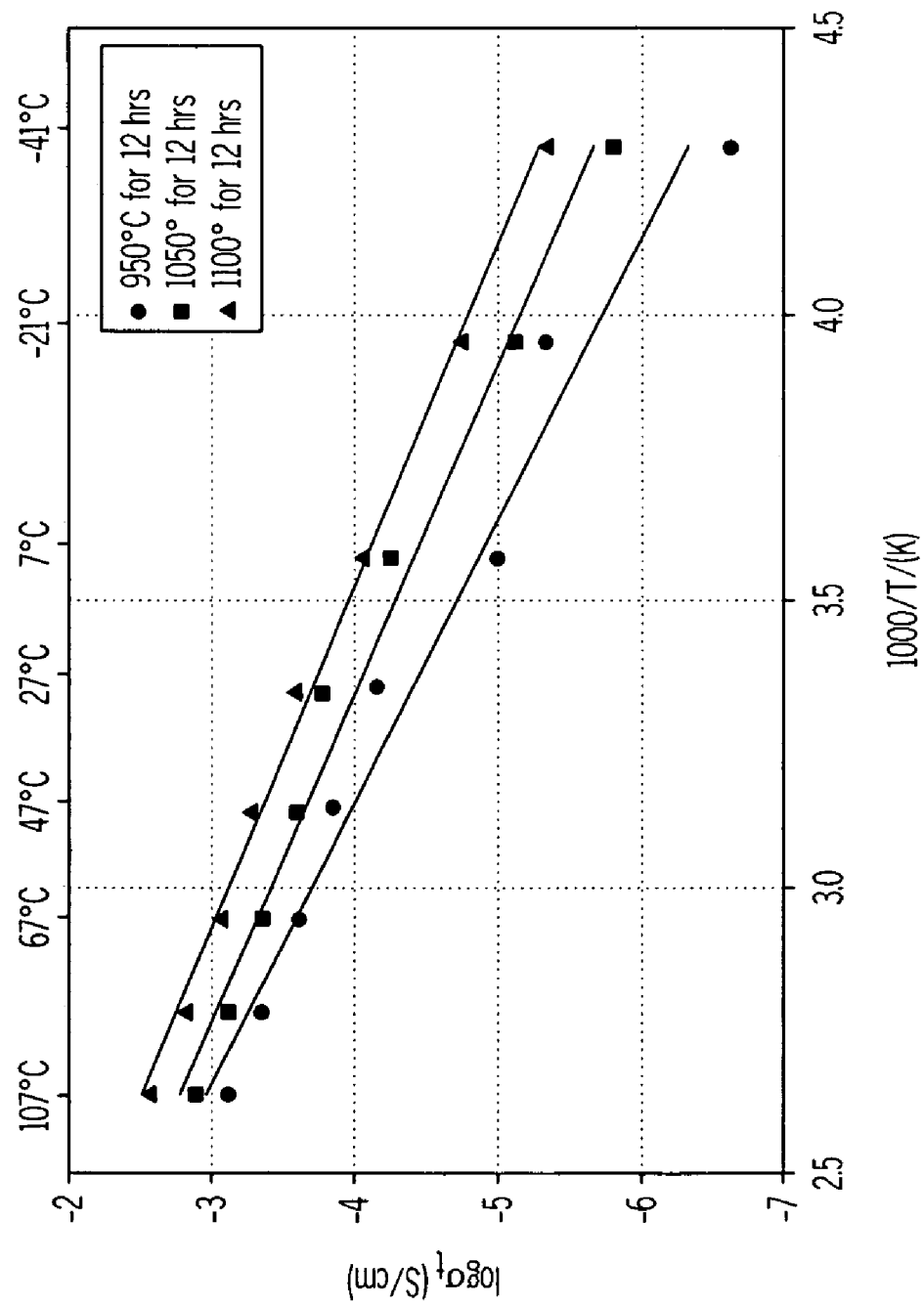
FIG. 1 is a graph illustrating total conductivity for glass-ceramic membranes thermally soaked at 950° C., 1050° C., and 1100° C.

The present invention provides a method for forming a solid electrolyte membrane for use in lithium batteries which comprises a glass-ceramic or polymer-ceramic composite. The solid electrolyte membrane may be formed as a porous or fully dense and water impermeable membrane, depending on the desired end use. The solid composite membrane and method of the present invention provide several advantages over prior membrane materials as the method provides a means of controlling the porosity, chemical stability, and conductivity of the resulting membrane as desired.

For EXAMPLE, where the glass-ceramic composite membrane is porous and is infiltrated with a polymer, the resulting polymer-ceramic composite membrane provides useful properties such as enhanced mechanical properties (strength and flexibility) and superior chemical stability in contact with water. This combination of two phases, i.e., sintered glass-ceramic membrane infiltrated with polymer, produces a polymer-ceramic membrane which can withstand a broad range of environmental and application requirements. It should also be appreciated that the porous membrane may be filled with a liquid electrolyte such as those used in state of the art lithium batteries; for EXAMPLE, $LiPF_6$ dissolved in ethylene carbonate and propylene carbonate mixed solvent.

For applications where high membrane conductivity is the primary consideration, a fully dense glass-ceramic membrane (0% porosity) may be formed. For applications where chemical stability is required along with good conductivity, the polymer infiltrated (water impermeable) polymeric-ceramic membrane is preferred.

The porosity of the membrane may be controlled by varying the sintering temperature and time. The sintering temperature may be varied from about 950° C. to 1200° C., depending on the desired porosity. For EXAMPLE, to achieve a porous membrane having about 50% porosity, a sintering temperature of 950° C. for 12 hours is sufficient. In order to achieve a fully dense membrane, a sintering temperature of between about 1100 to 1200° C. for 12 to 24 hours is preferred.

It should be appreciated that as the porosity of the membrane increases, its conductivity decreases. A fully dense membrane may exhibit conductivity as high as $10^{-3}$ S cm$^{-1}$ at room temperature. A membrane having a porosity of about 50% exhibits a conductivity of about $10^{-4}$ S cm$^{-1}$ at room temperature.

In the method of making the solid lithium ion conducting composite membrane, a glass or glass-ceramic powder may be used. A preferred mixture of raw materials for use in forming the powder comprises about 7.4 wt. % $Li_2CO_3$, about 6.6 wt. % $Al_2O_3$, about 21.7 wt. % $TiO_2$, and about 64.3 wt. % $NH_4H_2PO_4$.

To form a glass powder, the mixture of raw materials is preferably melted at a temperature between about 1400 to 1500° C. It should be appreciated that the melting temperature may vary, depending on the composition of the resulting glass components as shown below in Table 1. The mixture is then preferably cast onto a stainless steel plate. The cast glass is then annealed at a temperature of about 550° C. The annealed glass is then crushed to form a powder having the desired particle size.

TABLE 1

| Component | Mol Percent |
|---|---|
| $Li_2O$ | 10 to 20 |
| $Al_2O_3$ | 0 to 15 |
| $TiO_2$ | 20 to 60 |
| $P_2O_5$ | 30 to 60 |

To form a glass-ceramic powder, the raw materials are melted, cast onto a stainless steel plate, and then subjected to a crystallization heat treatment at about 950° C. for about 12 hours. The glass is converted to a crystalline ceramic. The resulting bulk glass-ceramic material is then crushed to form a powder having the desired particle size.

The resulting glass or glass-ceramic powder is mixed with a conditioning agent (fish oil), and one or more solvents, and is preferably milled for about 24 hours prior to being combined with a binder and one or more plasticizers to form a slurry. The slurry is then milled for another 24 hours prior to being cast into a green tape which is subjected to burnout and sintering processes. The preferred sintering method is a thermal soaking process in which the tape is held at the desired temperature for a given time. A typical batch for tape casting is shown below in Table 2.

TABLE 2

| Tape Cast Batch | | | | |
|---|---|---|---|---|
| Component | Function | Wt % | Weight (g) | Weight (ml) |
| Part I | | | | |
| Glass or glass-ceramic powder | | 69.40 | 13.88 | |
| Menhaden fish oil blown Z-3 | Dispersant | 1.19 | 0.238 | |
| Xylene | Solvent | 11.00 | 2.200 | 2.520 |
| Alcohol | Solvent | 12.50 | 2.500 | 3.227 |
| Milling for 24 hours | | | | |
| Part II | | | | |
| Poly(vinyl butyl) B-98 | Binder | 2.95 | 0.590 | |
| Butylbenzyl phthalate S-160 | Plasticizer | 1.48 | 0.296 | |
| Poly(alkylene glycol) | Plasticizer | 1.48 | 0.296 | |
| Milling for 24 hours | | | | |
| Total | | 100 | 20 | |

After sintering, the resulting porous glass-ceramic composite membrane may be subjected to polymer infiltration if desired to form a polymeric-ceramic composite having the desired mechanical strength, chemical durability, and water impermeability. Where the glass-ceramic membrane is infiltrated with polymers, the membrane preferably has an initial porosity of between about 25 to 50%. Preferred polymers for use in infiltration include polyethylene and polytetrafluoroethylene (Teflon®). To achieve infiltration, the polymer is preferably dissolved in a solvent and the partially sintered (porous) membrane is introduced into the polymer solution. A preferred solvent is toluene. After infiltration, the resulting polymer-ceramic membrane preferably has a porosity of from about 5 to 30%.

In order that the invention may be more readily understood, reference is made to the following examples which are intended to illustrate the invention, but not limit the scope thereof.

EXAMPLE 1

A glass batch comprising lithium carbonate ($Li_2CO_3$), alumina ($Al_2O_3$), titanium dioxide ($TiO_2$), and ammonium dihydrogen phosphate ($NH_4H_2PO_4$) was weighed, mixed and melted in a platinum crucible at a temperature between about 1400 to 1500° C. After melting, the glass was poured onto a stainless steel plate and annealed at 550° C. for 2 hours. The glass was then crushed into chunks, powdered, and screened. The powdered glass having a particle size range of 1 to 75 μm was mixed with fish oil, xylene, and alcohol, and then mixed by tumbling for 24 hours in a glass jar.

A binder (poly(vinyl butyl)) and a mixture of plasticizers (butylbenzyl phthalate and poly(alkylene glycol)) were then introduced into the glass jar, and the mixture was tumbled for another 24 hours. After a total tumbling time of 48 hours, the slurry was cast onto a Mylar® sheet and dried for 24 hours. The green tape which resulted was cut into the desired shape and size and subjected to burnout and sintering processes. A slow heating rate of from 25 to 400° C. (about 0.25° C./min.) was used to prevent the occurrence of warpage and pin holes. The heating rate was increased from 0.25° C./min. to 1.15° C./min. from 400° C. to 950° C.

FIG. 1 illustrates the Arrhenius plots of total conductivities of a membrane which has undergone binder burnout and sintering. The figure shows three curves corresponding to sintering temperatures of 950° C., 1050° C. and 1100° C. for a constant time of 12 hours. As can be seen, the specimen sintered at 950° C. showed the lowest conductivity, and as the temperature increased to 1100° C., the conductivity increased. The conductivity trend reflects consolidation of the porous structure with increasing sintering temperature. For EXAMPLE, the specimen sintered at 950° C. had a porosity of 50%, whereas the specimen sintered at 1100° C. exhibited a relatively dense structure (between 0-6% porosity). The conductivity of the specimen sintered at 1100° C. is around $5\times10^{-4}$ S cm$^{-1}$ at ambient temperature and increases to $10^{-3}$ S cm$^{-1}$ at 50° C. The densities of these specimens were 2.25, 2.57, and 2.71 g/cm$^3$ for sintering temperatures of 900° C., 1050° C., and 1100° C., respectively.

Figure 2:
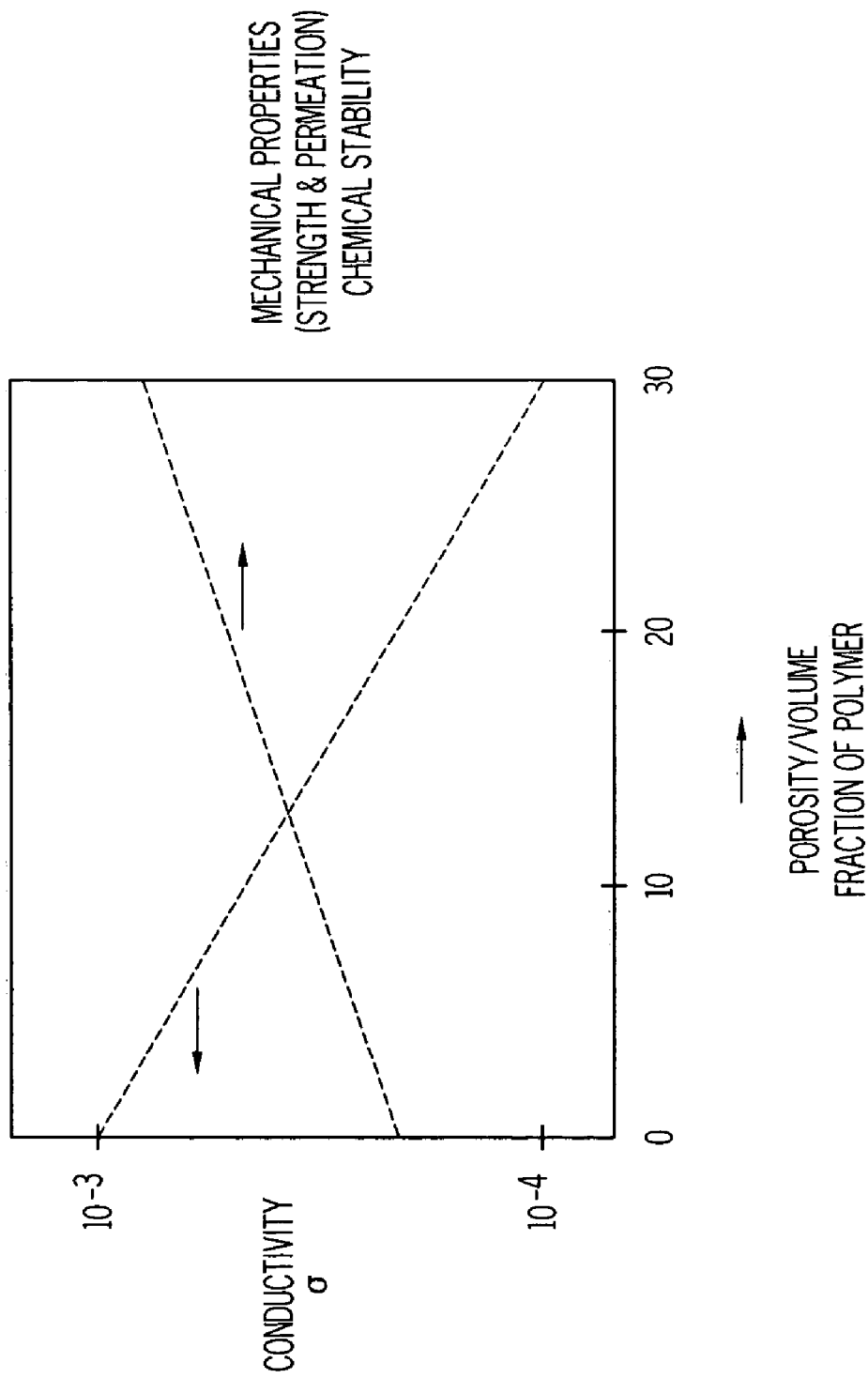
FIG. 2 is a graph schematically illustrating the relationship between porosity and conductivity for the membrane of the present invention.

FIG. 2 illustrates a schematic porosity-conductivity relationship for the membrane. As can be seen, as the porosity increases, the conductivity decreases. The relationship shown in FIG. 2 can be used to design and prepare membranes for specific applications.

EXAMPLE 2

A green tape made according to Example 1 was sintered at 950° C. for 12 hours. The partially sintered (porous) membrane was then infiltrated with polyethylene to provide water impermeability to the membrane. Polyethylene was dissolved in toluene, and the membrane was submerged in the polymer solution for about 15 minutes. The infiltrated specimen was then removed and dried.

After infiltration with polyethylene, there was a slight decrease in conductivity of the composite membrane.

EXAMPLE 3

A glass batch [14 $Li_2O.9 Al_2O_3.38 Al_2O_3.39 P_2O_5$ (mol%)] was prepared comprising the following reagent grade chemicals: $Li_2CO_3$ (Alfa Aesar), $Al_2O_3$ (Aldrich, particle size <10 μm), $TiO_2$ (Acros Organics), and $NH_4H_2PO_4$ (Acros Organics). The chemicals were weighed, mixed, and melted in a platinum crucible. The furnace was initially heated slowly to 450° C. and held at that temperature for 1 hour to release volatile batch components. Subsequently, the furnace was heated with a slightly higher heating rate to 1450° C. and the glass was melted to a homogeneous liquid in about 1.5 hours. After melting, the glass was poured onto a preheated (550° C.) stainless steel plate and pressed by another preheated stainless steel plate. The processed glass appeared transparent and amber-colored. Subsequently, the pressed glass plate was broken into chunks, powdered, and screened for further processing.

The powdered glass having a particle size range of 1 to 75 μm was dried at 120° C. overnight. The dry powder was mixed with fish oil, xylene, and alcohol, and tumbled for 24 hours in a glass jar. A binder and a mixture of plasticizers were subsequently introduced into the glass jar and the mixture was tumbled for another 24 hours. After a total tumbling time of 48 hours, the slurry was cast onto a Mylar® sheet using a firm and clean doctor blade. The cast tape was dried for 24 hours at room temperature. The tape shrank nearly 40% while drying. The green tape obtained was cut into the desired shape and size and subjected to a burnout and thermal soaking process. For the burnout, a slow heating rate of 0.25° C./min. from 25° C. to 400° C. was used to prevent the occurrence of warping and pin holes. The heating rate was increased to 1.15° C./min from 400° C. to 950° C. and soaked at 950° C. for 12 hours. The thermal soaking transformed the glass to a crystalline ceramic (i.e., "glass-ceramic") and densified the specimen to form a glass-ceramic membrane. The membranes formed were 50 to 350 μm thick.

Figure 3:
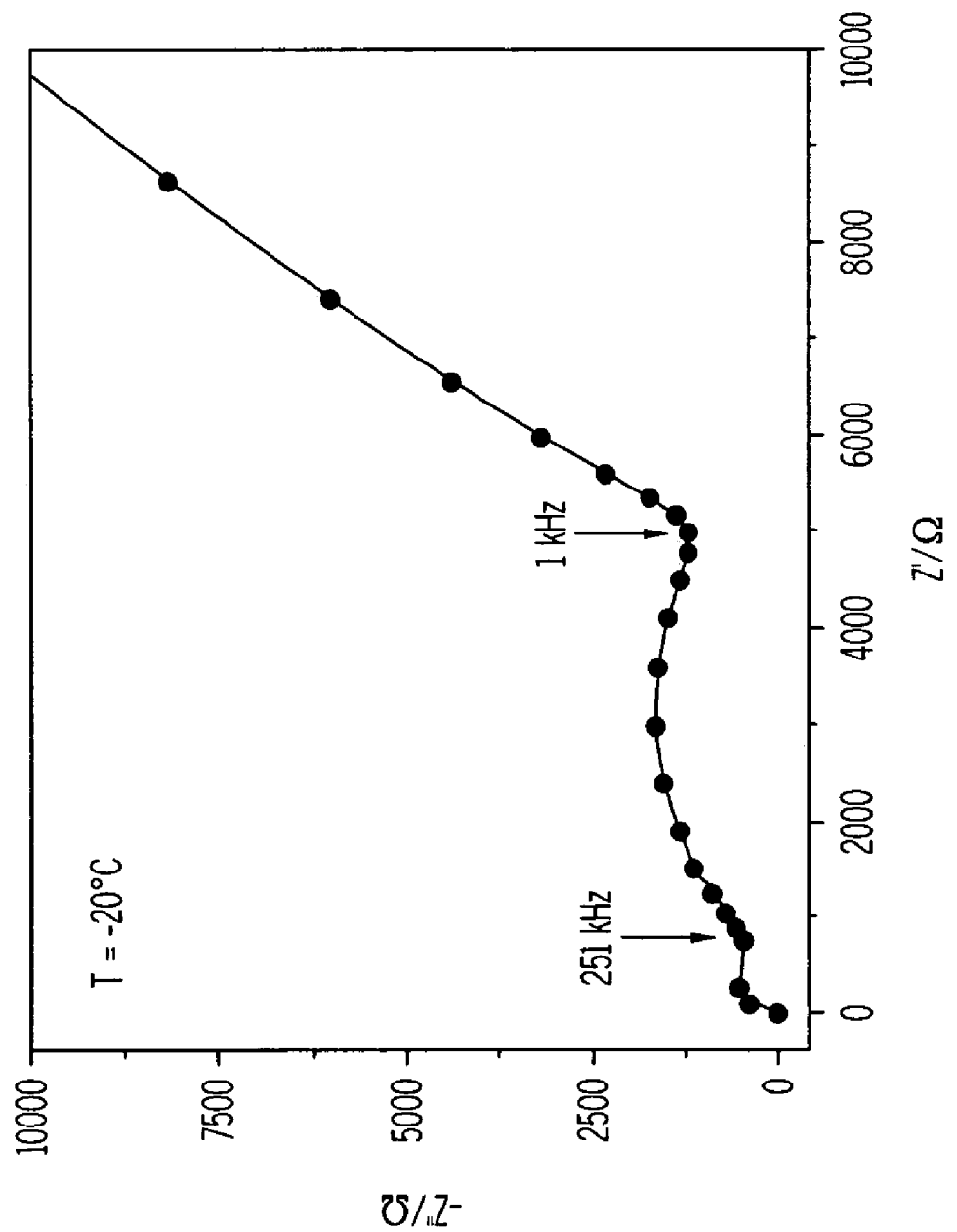
FIG. 3 is a graph illustrating AC impedance spectra of a membrane specimen at −20° C. which was prepared by thermal soaking at 1100° C. for 12 hours.

AC impedance measurements were conducted on the membranes by sputtering a gold coating on both sides of the membrane to minimize electrode effects. The gold sputtered specimen was assembled into a cell using stainless steel (SS) electrodes in a cell fixture. The fixture containing the SS/electrolyte/SS cell was subsequently placed in a stable fixture holder with attached electrical wires leading to an impedance spectrometer. Impedance measurements on the cell were carried out using a Solartron instrument (Model 1290 with an electrochemical interface) in the 0.01 to $10^6$ Hz frequency range. Z plot software was employed for data analysis and presentation. The AC impedance of the electrolyte was measured in the −40 to 107° C. temperature range. At each temperature, the specimen was equilibrated for 1 hour before the impedance measurement. The conductivity of the specimen was computed from the AC impedance spectra. FIG. 3 illustrates AC impedance spectra of a membrane specimen at −20° C. which was prepared by thermal soaking at 1100° C. for 12 hours. The grain, grain boundary, and bulk conductivities ($\sigma_g$, $\sigma_{gb}$, $\sigma_b$) at ambient temperature were found to be 1.5, 0.32 and 0.26 mS cm$^{-1}$.

The grain conductivity was found to increase with increased thermal soaking temperature. The activation energies for the transport of lithium ions across the grain boundary for the membranes were determined to be 34.73, 33.02, and 31.60 kJ mol$^{-1}$, respectively.

The ambient temperature bulk conductivities for specimens thermally soaked at 950, 1050, and 1100° C. were 0.08, 0.17 and 0.26 mS cm$^{-1}$, respectively. The specimen sintered at 950° C. showed the lowest conductivity and the conductivity increased as the soaking temperature was increased to 1100° C. The densities of these specimens were 2.25, 2.57, and 2.71 g cm$^{-3}$. It was noted that the measured experimental density of a fully dense specimen was 2.84 gm cm$^{-3}$. Therefore, it can be concluded that the specimen sintered at 1100° C. was approximately 95% dense.

EXAMPLE 4

The partially sintered (porous) membranes of EXAMPLE 3 were infiltrated with polyethylene in a specially-designed apparatus. The porous membrane was placed inside a heated and enclosed funnel on a fritted disc (pore size 10 to 15 μm) and subsequently evacuated. A solution of polyethylene in toluene was allowed to enter the evacuated funnel. The infiltrated specimen was subsequently removed, dried, and cleaned for further evaluation.

Figure 4:
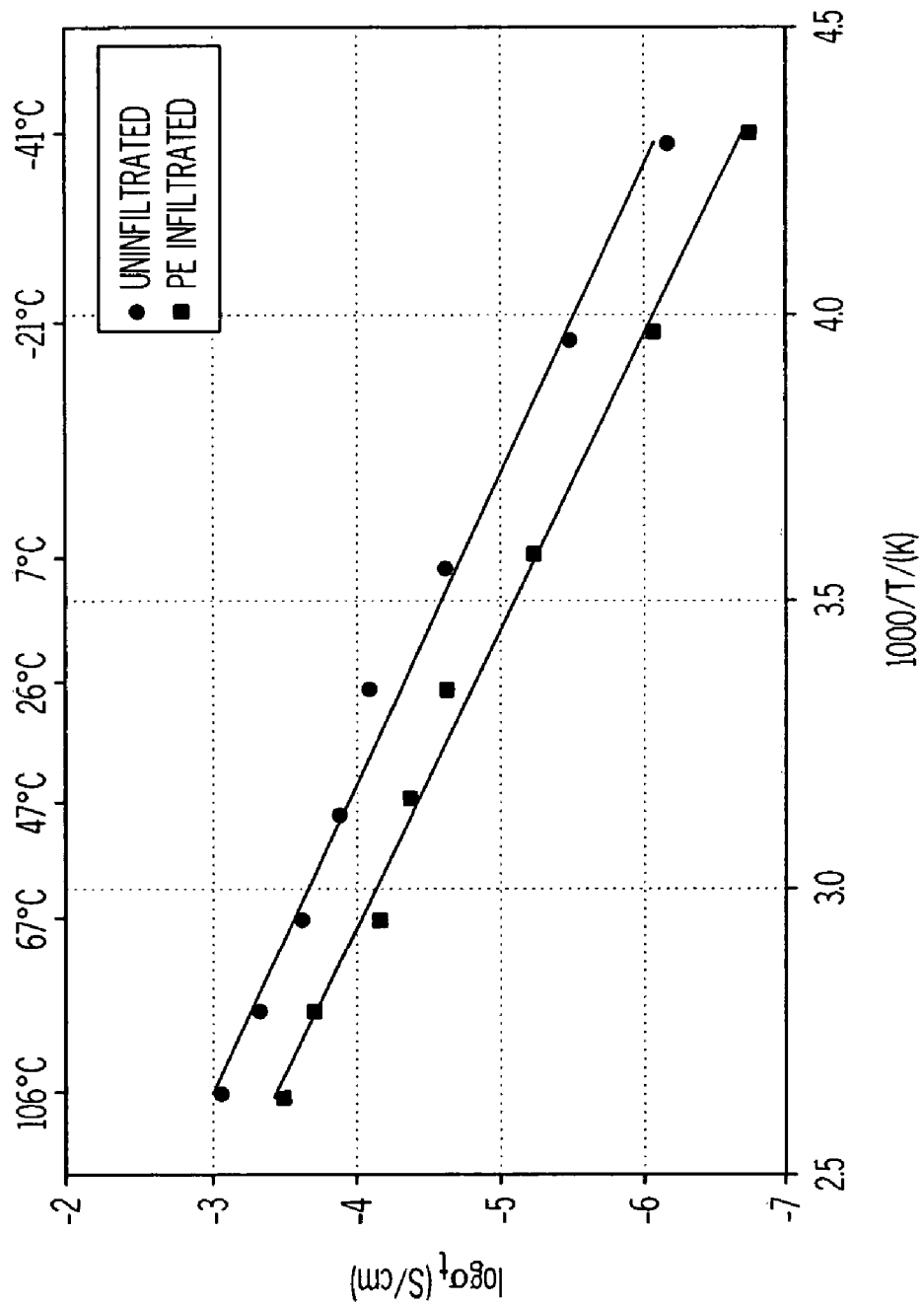
FIG. 4 is a graph illustrating conductivity of a sintered membrane before and after polyethylene infiltration.

The membranes which had previously been soaked at 950° C. for 12 hours were found to have a porosity of about 50%. After polymer infiltration, it was determined that 17.72% of the pores in the membrane were filled. FIG. 4 illustrates Arrhenius plots of bulk conductivity for porous membranes before and after polymer infiltration. It was noted that the conductivity was lowered by approximately a factor of five due to the infiltration. The activation energies for the transport of lithium ions for porous and polyethylene infiltrated membranes were determined to be 34.81 and 36.35 kJ mol$^{-1}$, respectively.

To test the stability of membranes, both porous and polymer infiltrated membranes were immersed in tap water for several weeks. The polymer infiltrated membrane was observed to exhibit better stability in comparison with the porous, uninfiltrated specimen, which exhibited a slight buckling after 65 days of immersion in water.

Having described the invention in detail and by reference to preferred embodiments thereof, it will be apparent that modifications and variations are possible without departing from the scope of the invention.

What is claimed is:

1. A method of forming a solid composite electrolyte membrane for use in a lithium battery comprising:
   providing a glass or glass-ceramic powder formed from a mixture of lithium carbonate, alumina, titanium dioxide, and ammonium dihydrogen phosphate;
   mixing said powder with a conditioning agent and at least one solvent to form a slurry;
   adding a binder and at least one plasticizer containing organic components to said slurry;
   casting said slurry into a tape; and
   heating said tape to burn off said binder and sintering said tape to form said membrane.

2. The method of claim 1 wherein said tape is heated at a temperature from about 25° C. to 400° C. to burn off said organic components.

3. The method of claim 1 wherein said tape is sintered at a temperature of from 400 to 1200° C.

4. The method of claim 1 wherein said membrane has a porosity of from about 0% to about 50%.

5. The method of claim 1 wherein said membrane is porous and said method includes infiltrating said porous membrane with a polymer.

6. The method of claim 5 wherein said polymer is selected from polyethylene and polytetrafluoroethylene.

7. The method of claim 1 wherein said powder comprises from about 2 to about 7 wt % lithium oxide.

8. The method of claim 1 wherein said powder comprises from about 7 to about 12 wt % alumina.

9. The method of claim 1 wherein said powder comprises from about 25 to about 45 wt % titanium dioxide.

10. The method of claim 1 wherein said powder comprises from about 30 to about 70 wt % diphosphorous pentoxide.

11. The method of claim 1 wherein said glass-ceramic powder has a particle size of from about 1 to about 75 μm.

12. The method of claim 1 wherein said glass-ceramic powder has a particle size of from about 1 to 45 μm.

13. The method of claim 1 wherein said conditioning agent comprises fish oil.

14. The method of claim 1 wherein said at least one solvent is selected from xylene, alcohol, or combinations thereof.

15. The method of claim 1 wherein said binder comprises poly(vinyl butyl).

16. The method of claim 1 wherein said at least one plasticizer is selected from butylbenzyl phthalate, poly(alkylene glycol), and combinations thereof.

* * * * *